United States Patent
Wai et al.

(10) Patent No.: US 9,647,595 B2
(45) Date of Patent: May 9, 2017

(54) CURRENT PROFILE STRATEGY FOR MINIMIZING TORQUE RIPPLE AND CURRENT

(71) Applicant: Caterpillar Inc, Peoria, IL (US)

(72) Inventors: Jackson Wai, Dunlap, IL (US); Carlos Nino Baron, Edwards, IL (US); Jesse Gerdes, Dunlap, IL (US); Ernesto Inoa, Dunlap, IL (US); Ahmed Khalil, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 393 days.

(21) Appl. No.: 14/266,110

(22) Filed: Apr. 30, 2014

(65) Prior Publication Data

US 2015/0318806 A1 Nov. 5, 2015

(51) Int. Cl.
| H02K 29/06 | (2006.01) |
| H02P 6/10 | (2006.01) |
| H02P 25/098 | (2016.01) |
| B62D 5/04 | (2006.01) |
| H02P 6/14 | (2016.01) |
| H02K 29/08 | (2006.01) |

(52) U.S. Cl.
CPC .............. *H02P 25/098* (2016.02); *H02P 6/10* (2013.01); *B62D 5/046* (2013.01); *H02K 29/08* (2013.01); *H02P 6/14* (2013.01); *Y02T 10/7258* (2013.01)

(58) Field of Classification Search
CPC ..... H02P 6/10; H02P 6/14; H02P 6/08; B62D 5/046; H02K 29/08

USPC .................................................... 318/400.23
See application file for complete search history.

(56) References Cited

U.S. PATENT DOCUMENTS

| 4,868,477 A | 9/1989 | Anderson et al. |
| 4,933,621 A | 6/1990 | MacMinn et al. |
| 5,923,141 A | 7/1999 | McHugh |
| 5,986,418 A | 11/1999 | Horst et al. |
| 6,078,161 A | 6/2000 | Kim et al. |
| 6,756,757 B2 | 6/2004 | Marcinkiewicz et al. |
| 6,922,036 B1 | 7/2005 | Ehsani et al. |
| 2003/0067280 A1 | 4/2003 | Wang et al. |
| 2007/0285044 A1 | 12/2007 | Nakatsugawa et al. |
| 2009/0140678 A1 | 6/2009 | Nakao |

(Continued)

FOREIGN PATENT DOCUMENTS

| EP | 2131484 | 12/2009 |
| JP | 2005039932 | 2/2005 |
| KR | 1020120133756 | 12/2012 |

*Primary Examiner* — Kawing Chan
*Assistant Examiner* — Bradley Brown
(74) *Attorney, Agent, or Firm* — Miller, Matthias & Hull

(57) ABSTRACT

A method of controlling an electric motor may include determining a desired torque at the electric motor. A current at a first phase of the electric motor may be calculated at a controller. The calculated current may be a current that results in supplying the desired torque at the electric motor. The controller may compare the calculated current to a predetermined threshold current, and when the calculated current is greater than the predetermined threshold current, the controller may reduce the calculated current to the predetermined threshold current and adjust a current in a second phase adjacent to the first phase of the electric motor to continue to supply the desired torque at the electric motor.

16 Claims, 10 Drawing Sheets

(56) References Cited

U.S. PATENT DOCUMENTS

2010/0295492 A1* 11/2010 Chakrabarti .......... B60L 3/0038
                                                                                318/490
2011/0095713 A1* 4/2011 Son .......................... H02P 6/20
                                                                                318/400.11

* cited by examiner

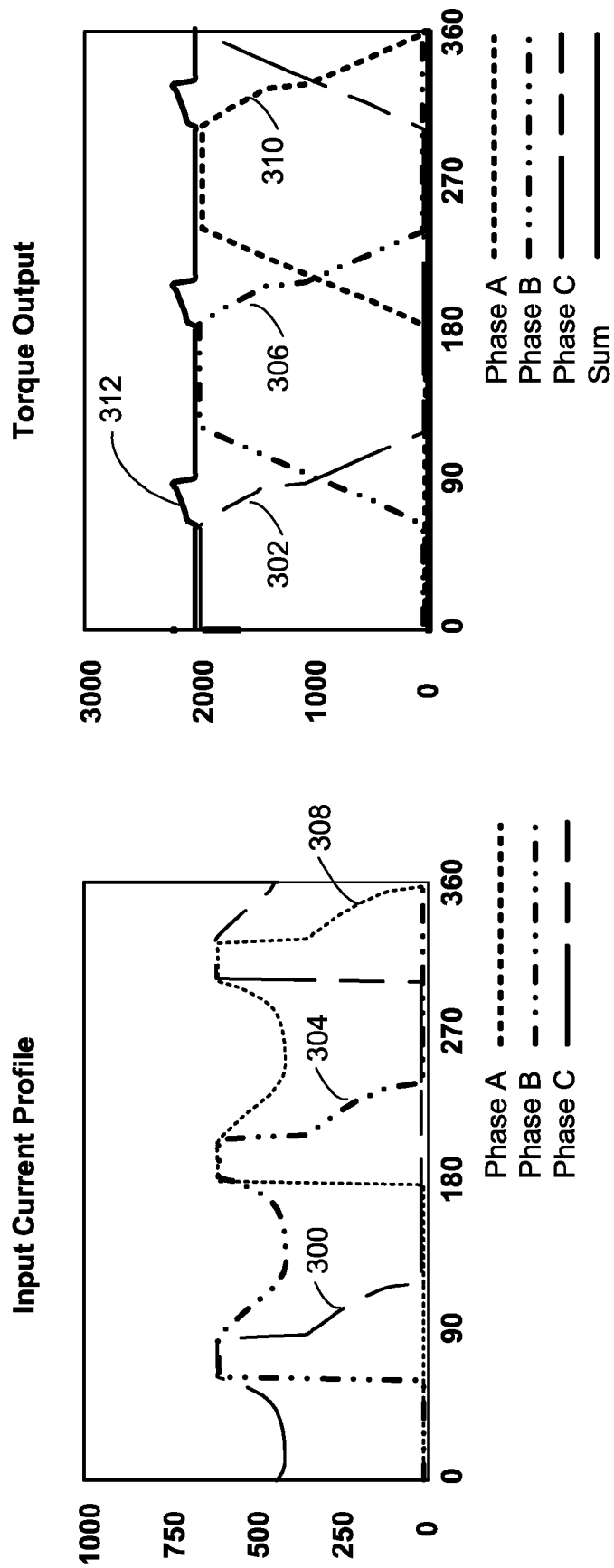

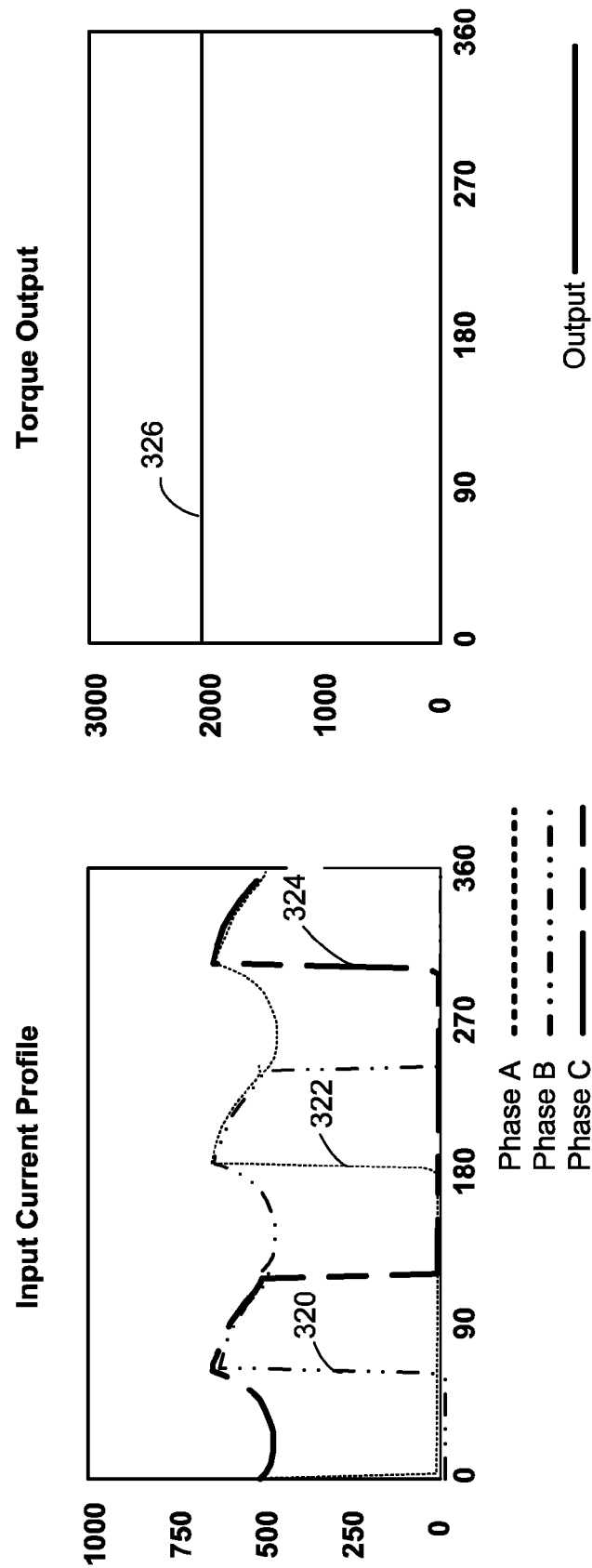

CURRENT PROFILE STRATEGY FOR MINIMIZING TORQUE RIPPLE AND CURRENT

TECHNICAL FIELD

The present disclosure relates generally to electric drive systems, and more particularly, to systems and methods of managing torque ripple during operation of an electric motor.

BACKGROUND

With the growing interest in energy conservation, increasingly more industrial work machines are supplied with electric drive assemblies or systems for driving the work machine and operating its various tools or functions. Ongoing developments in electric drive systems have made it possible for electrically driven work machines to effectively match or surpass the performance of predominantly mechanically driven work machines while requiring significantly less fuel and overall energy. As electric drive systems become increasingly more commonplace with respect to industrial work machines, and the like, the demands for more efficient motors and generators and techniques for controlling them have also increased.

A generator of an electric drive machine is typically used to convert mechanical power received from a primary power source, such as a combustion engine, into electrical power for performing one or more operations of the work machine. Additionally, an electric motor may be used to convert electrical power stored within a common bus or storage device into mechanical power. Among the various types of electric motors available for use with an electric drive system, switched reluctance machines have received great interest for being robust, cost-effective, and overall, more efficient. While currently existing systems and methods for controlling switched reluctance machines may provide adequate control, there is still much room for improvement.

For example, square wave input current control profiles are easy to implement and protect the windings of an electric motor from high currents. However, such current control profiles may produce significant variations in torque produced by the electric motor in the course of one rotor cycle, known as torque ripple. Other current profiles may produce a flat torque output with high torque, but may require winding currents that exceed the rated winding current. Producing motors with excessive rating capabilities to accommodate high transient currents is not cost effective.

Control schemes for switched reluctance machines may involve operating two switches of each phase leg of the machine to pulse or chop the electrical current thereby effectively providing a waveform, such as a pulse width modulated (PWM) waveform. U.S. Pat. No. 6,756,757 (the '757 patent) teaches use of a solver to calculate a desired torque profile and uses a lookup table to produce a flat torque output. However, the '757 patent fails to recognize maximum phase current limitations and the effect of limiting phase current on generated torque.

The present disclosure solves one or more of the problems set forth above and/or other problems in the art.

SUMMARY OF THE DISCLOSURE

In an aspect of the disclosure, a method of controlling an electric motor may include determining a desired torque at the electric motor, calculating, at a controller, a calculated current at a first phase of the electric motor, the calculated current being a current that results in supplying the desired torque at the electric motor. The method may continue by comparing, at the controller, the calculated current to a predetermined threshold current and when the calculated current is greater than the predetermined threshold current, reducing, at the controller, the calculated current to the predetermined threshold current. The method may also include adjusting a current in a second phase adjacent to the first phase of the electric motor to continue to supply the desired torque at the electric motor.

In another aspect of the disclosure, a system for controlling an electric motor includes a switching bank configured to individually control current in each of a plurality of phases of a stator in the electric motor and a controller. The controller may be configured to determine a desired torque to be produced by the electric motor, calculate a current during a first phase of the electric motor required to supply the desired torque, and determine whether the calculated current during the first phase is greater than a threshold current for the first phase. When the calculated current is greater than the threshold current, the controller may limit the calculated current during the first phase to the threshold current and increase a current in a second phase of the stator adjacent to the first phase to at least partially compensate for a shortfall of torque at the first phase resulting from limiting the calculated current during the first phase.

In yet another aspect of the disclosure, a method of managing torque and phase current in an electric motor using a controller may include limiting, via the controller, current in a first phase of the electric motor at a predetermined threshold current in response to a load on the electric motor that requires current in the first phase that is greater than the predetermined threshold current. When current is limited in the first phase, increasing, via the controller, current in a second phase of the electric motor by an amount sufficient to allow the electric motor to meet the load.

BRIEF DESCRIPTION OF THE DRAWINGS

FIG. 9A and FIG. 9B are input current and output torque charts in accordance with the current disclosure; and FIG. 10A and FIG. 10B are input current and output torque charts in accordance with another embodiment of the current disclosure.

DETAILED DESCRIPTION

Figure 1:
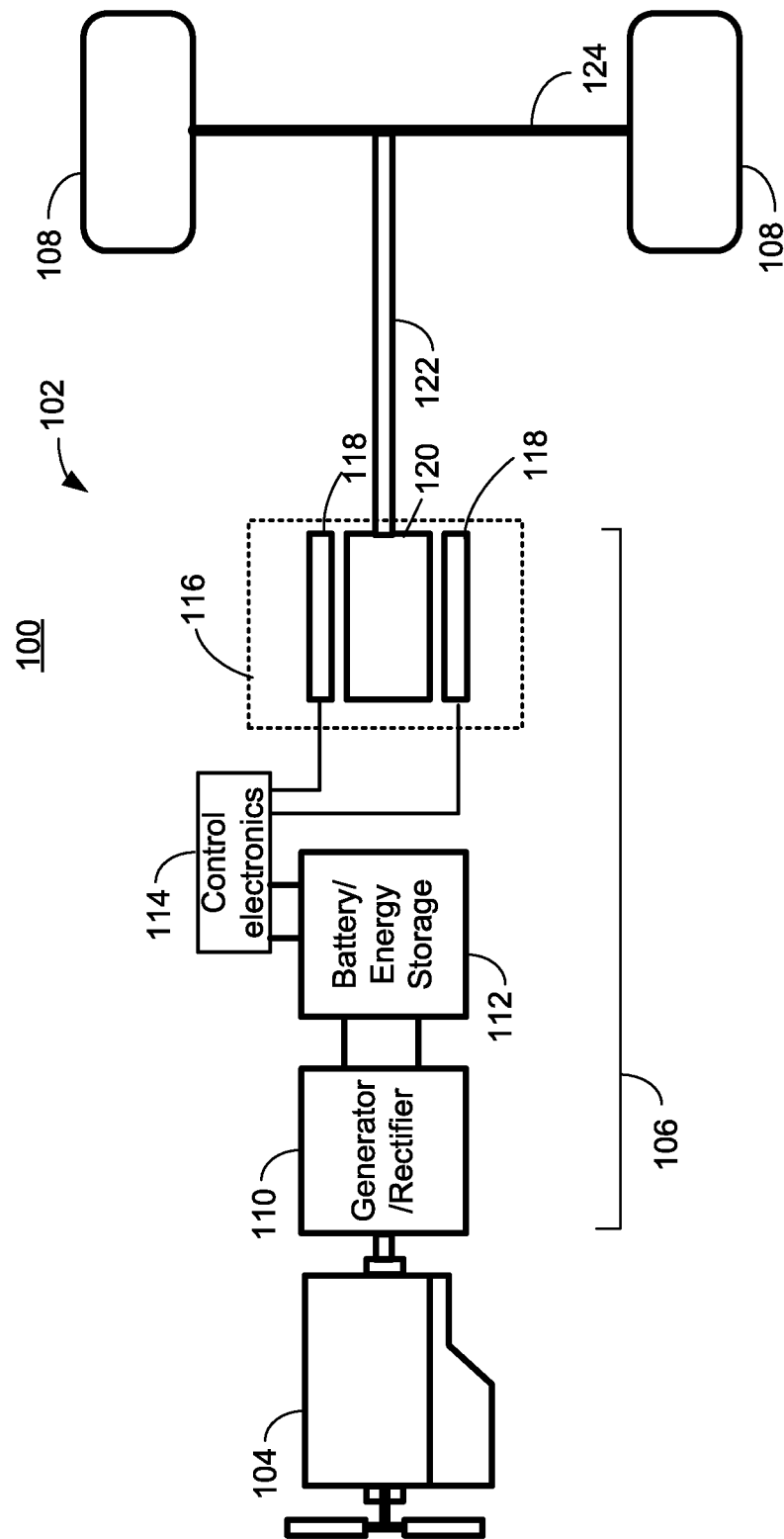
FIG. 1 is a diagrammatic view of one exemplary machine with an electric drive system.

FIG. 1 diagrammatically illustrates a drive train 102 of a machine 100 that may employ electric drive means for causing movement and/or for performing work. More specifically, the machine 100 may include a power source 104 that may be coupled to an electric drive system 106 for causing movement via a traction device 108. Such a machine 100 may be used as a work machine for performing a particular type of operation associated with an industry, such as mining, construction, farming, transportation, or any other industry known in the art. For example, the machine 100 may be an earth moving machine, a marine vessel, an aircraft, a tractor, an off-road truck, an on-highway passenger vehicle, or any other mobile machine. In other alternative implementations, the electric drive system 106 may be used in conjunction with stationary applications and implemented with, for instance, windmills, hydro-electric dams, batteries, fuel cells, or any other suitable source of energy. The power source 104 of the electric drive system 106 may include, for example, a diesel engine, a gasoline engine, a natural gas engine, or any other type of combustion engine commonly used for generating power.

In the exemplary embodiment illustrated, the power source 104 drives a generator 110, or other electric generating mechanism, with the generated energy being stored in a battery 112 or other energy storage device, such as a capacitor. Control electronics 114 may then drive the poles of a stator 118 of an electric motor 116. The rotor 120 may transmit power via a driveshaft 122 to an axle 124 for powering the traction device 108. In other embodiments, the driveshaft 122 may couple to a power takeoff unit that drives hydraulic pumps instead of or in addition to powering the traction device 108. In the illustrated, exemplary embodiment, the electric motor 116 is a switched reluctance (SR) motor.

Figure 2:
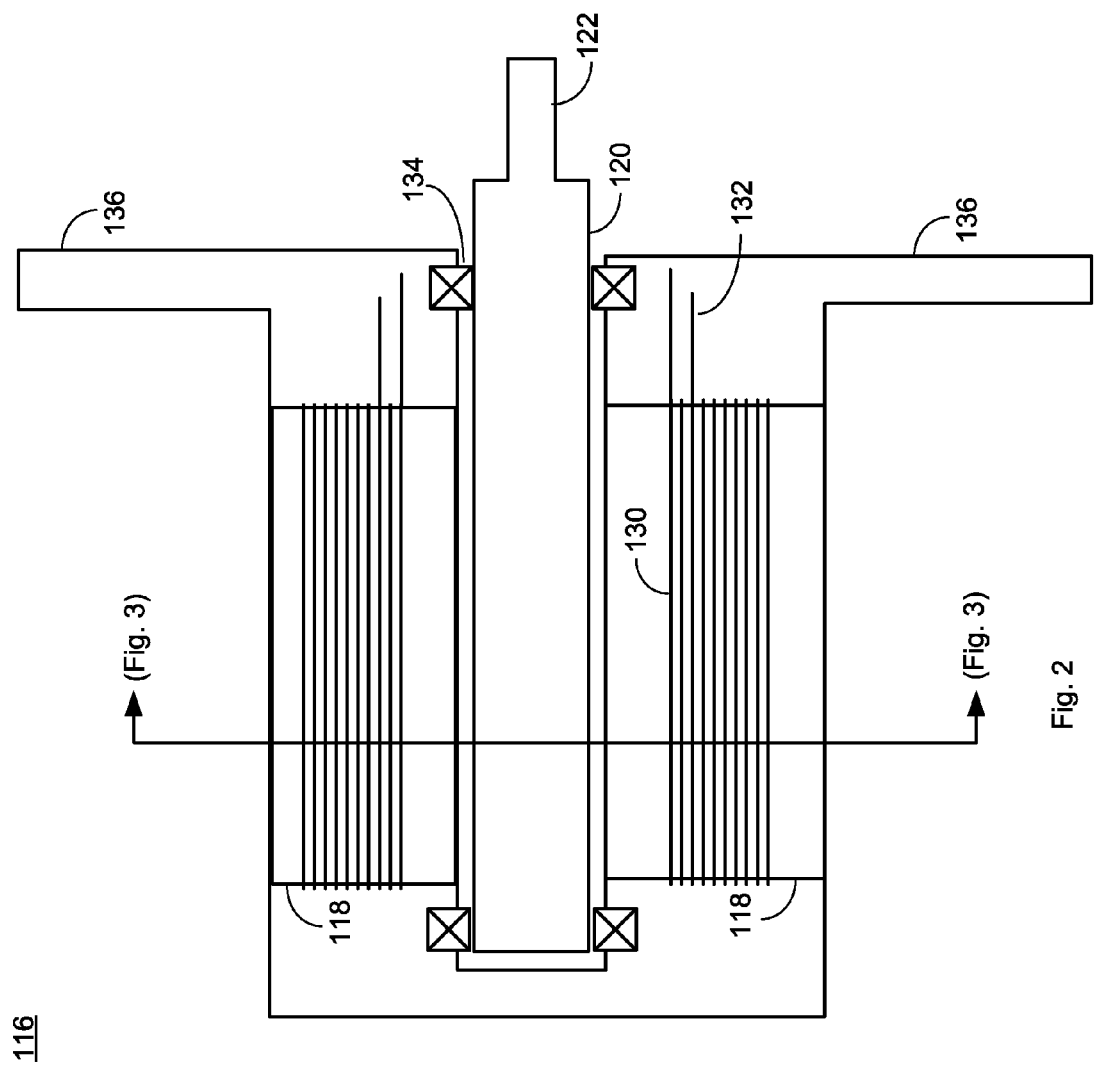
FIG. 2 is a section view of an exemplary electric motor.

FIG. 2 is a side section view of an embodiment of electric motor 116. The electric motor 116 can include, as discussed above, a rotor 120 and a stator 118. The rotor 120 can be coupled to the driveshaft 122. Bearings, such as bearing 134, may be used to support the rotor 120.

The stator 118 can be mounted by supports 136. As will be appreciated, numerous variations exist for providing the mechanical mounting of the electric motor 116 and its various components. As will be discussed in more detail below, the stator 118 includes numerous poles having windings 130 that can be coupled to the control electronics 114 via leads 132.

Figure 3:
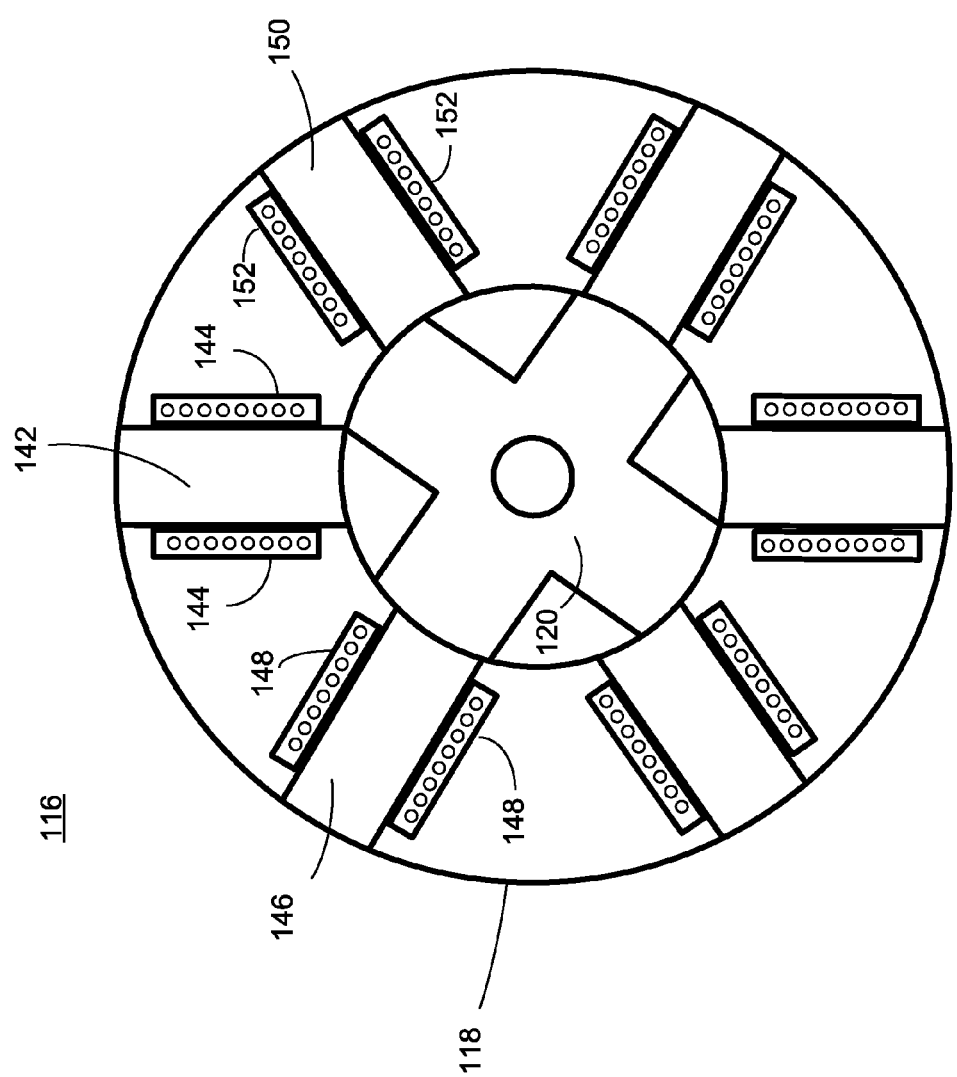
FIG. 3 is another section view of the exemplary electric motor of FIG. 2.

FIG. 3 is a cross-section view of the electric motor 116 of FIG. 2. This view shows the rotor 120 and the stator 118. This view also shows a first stator pole 142 and its corresponding stator windings 144, a second stator pole 146 and its corresponding windings 148, and a third stator pole 150 and its corresponding stator windings 152. In this exemplary embodiment, the rotor 120 has 4 poles and the stator 118 has six poles. Opposite stator poles may be energized concurrently. Other configurations of poles in the stator 118 and rotor 120 are also viable.

Figure 4:
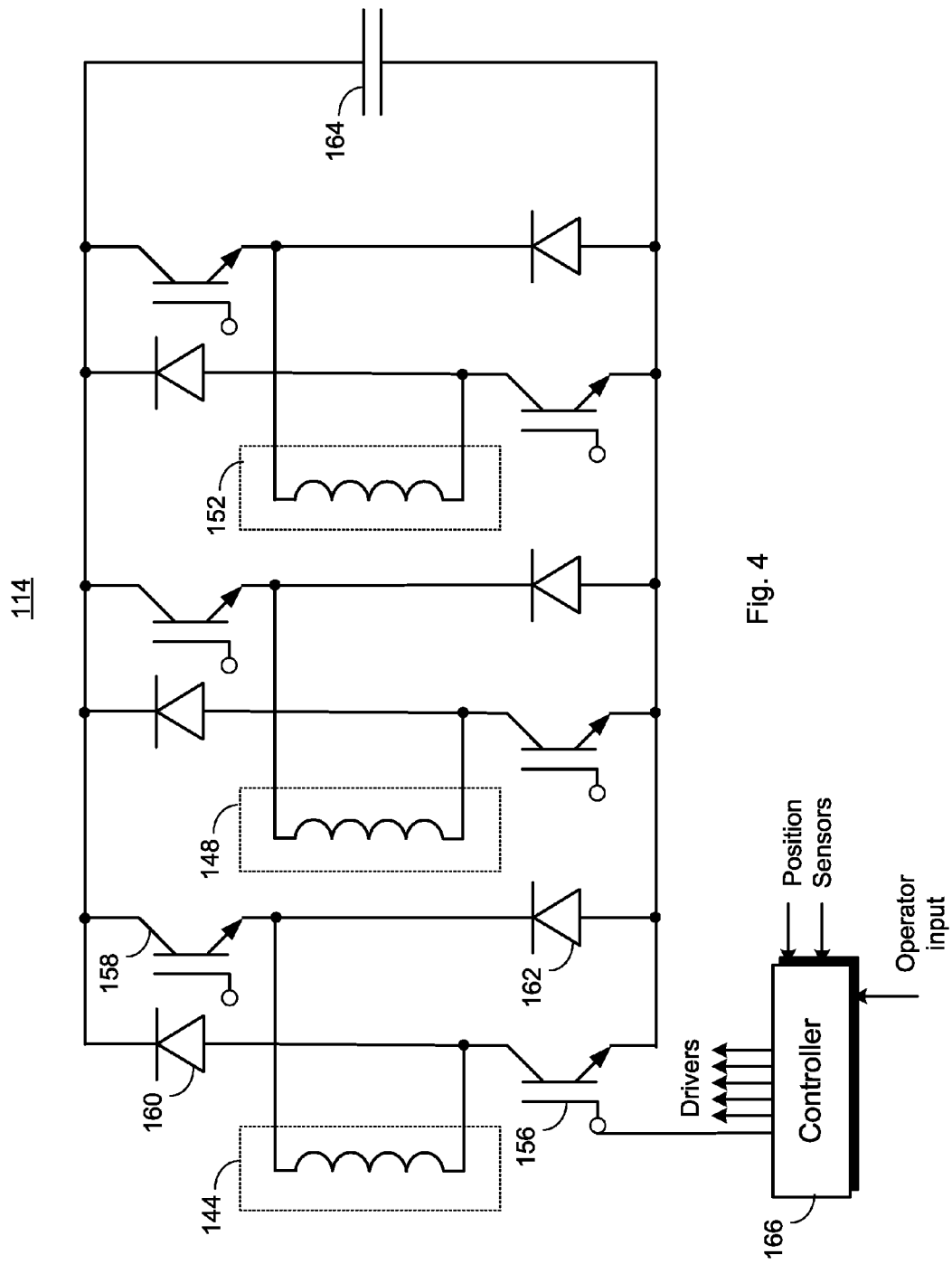
FIG. 4 is a schematic diagram of an exemplary control electronics unit.

FIG. 4 illustrates one embodiment of control electronics 114 suitable for use with the electric motor 116 of FIG. 2. Recalling that opposite pairs of stator poles may be energized together, the control electronics may include a switching bank of drivers for each of the three sets of stator windings 144, 148, 152 depicted by inductors in the figure. Each of the drivers may be the same and may include a low side drive transistor 156, a high side drive transistor 158, and a pair of diodes 160 and 162. A capacitor 164 can be used to store electricity or filter power to reduce DC ripple in electric energy supplied by the battery 112 or generator 110 that may also include a rectifier.

A controller 166 receives position information from position sensors (not depicted) on the rotor 120 and/or the driveshaft 122. The controller 166 also includes output drivers for each of the paired transistors that drive the stator windings 144, 148, 152. The transistors 156 and 158 can be insulated gate bipolar transistors (IGBT) known for their high current capacity and fast switching speed. In operation, when both transistors 156 and 158 are turned on current flows through each of each stator winding 144 and its paired poles and builds up a magnetic field. When the transistors 156 and 158 are turned off at an appropriate point during the rotation of the rotor 120, the collapsing magnetic field generates electric current that is transmitted via diodes 160 and 162 back to the capacitor 164.

Figure 5:
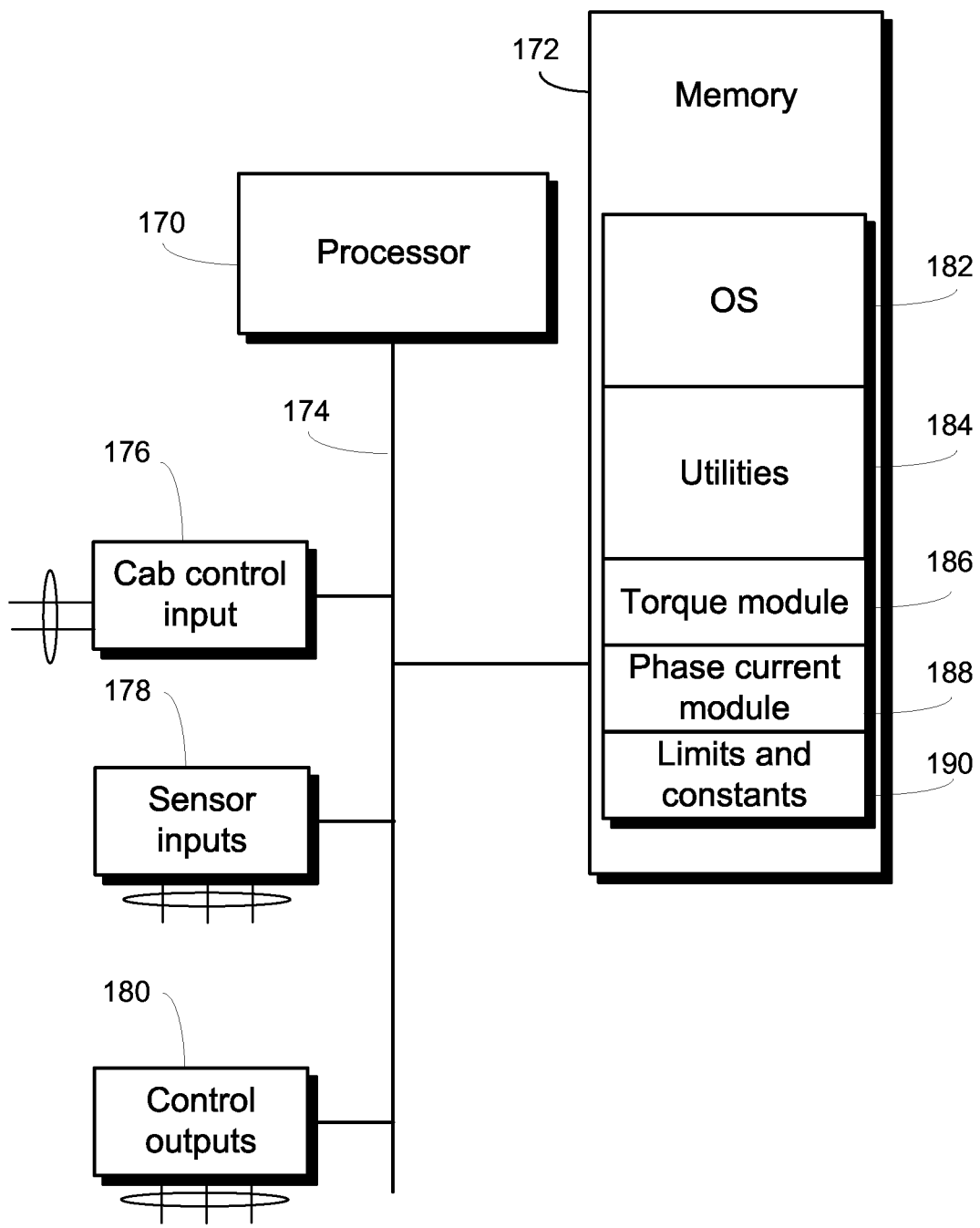
FIG. 5 is a block diagram of an exemplary controller for the control electronics unit.

FIG. 5 is an exemplary embodiment of a controller 166 including a processor 170 and a memory 172, coupled to each other by a data bus 174. The controller 166 may also include a control input 176 from a cab that relays requests by an operator for a particular action, such a request for forward propulsion. The controller 166 may also include sensor inputs 178 such as position sensors on the rotor 120 or driveshaft 122 that receive signals indicative of the position of the rotor for use in calculating winding current settings. The controller 166 may also include control output 180 used to energize and de-energize individual pole pairs in the stator 118.

The processor 170 may be any of a number of known computer processor architectures, including, but not limited to, single chip processors or conventional computer architectures. The memory 172 may be any combination of volatile and non-volatile memory, including rotating media, flash memory, conventional RAM, ROM or other non-volatile programmable memory, but does not include carrier waves or other propagated media. The controller 166 may also include a communication port (not depicted) providing support for communication with external devices, such as another engine computer or body electronics (not depicted).

The memory 172 may have modules containing computer-executable instructions for various operational and control functions and may include an operating system 182 and utilities 184 used, for example, for sending and receiving signals and basic operational tasks. The memory 172 may also include a torque module 186 that processes operator inputs to calculate a requested torque output for the electric motor 116. A phase current module may take data from the torque module and use rotor position data and torque characterization data for the electric motor 116 to calculate a required phase current to achieve the requested torque output. Another module 190 may contain limits and constraints used by the phase current module to make decisions about maximum or other threshold current limits and alternate phase torque capabilities.

INDUSTRIAL APPLICABILITY

Figure 6:
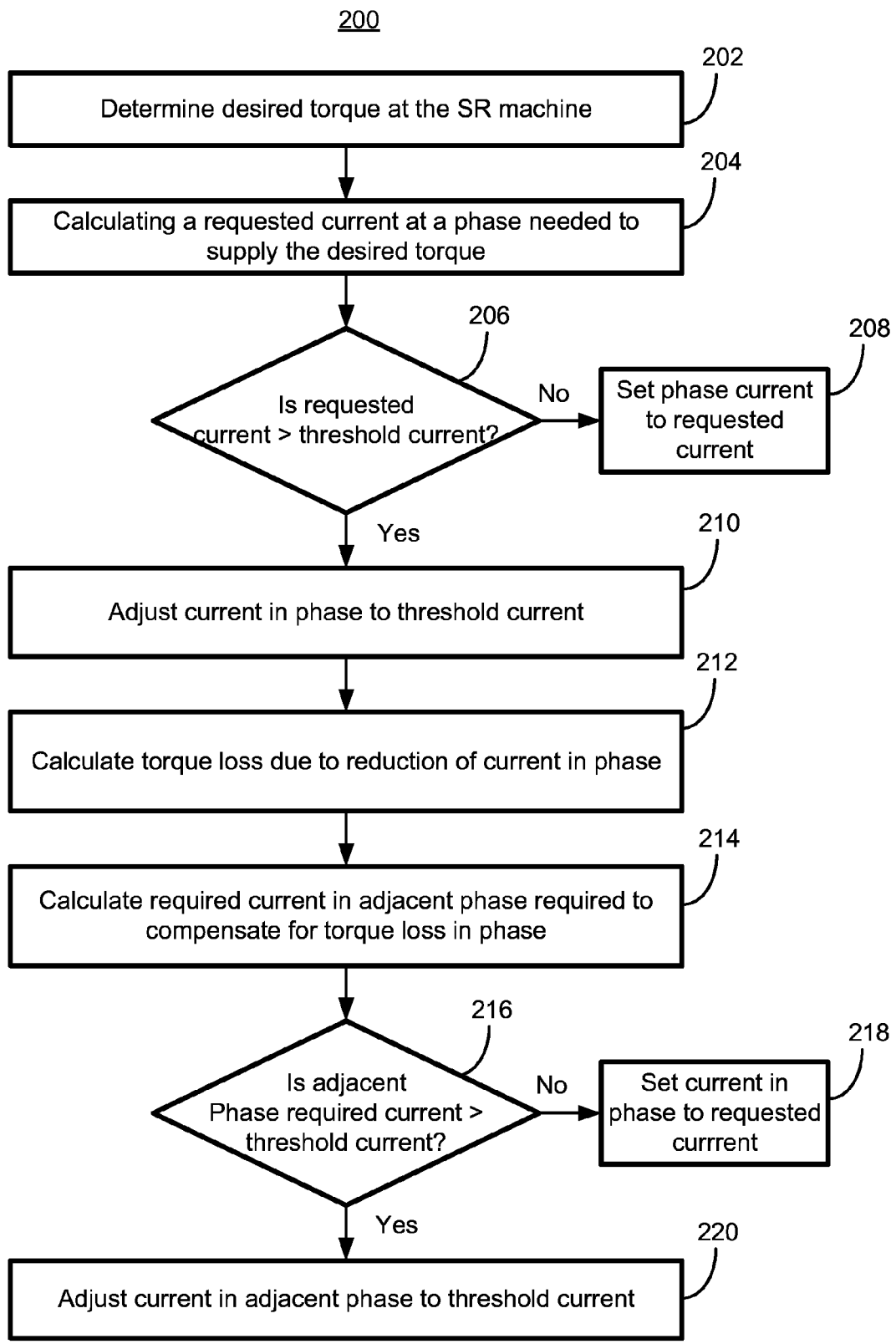
FIG. 6 is a flowchart of an exemplary method of implementing a current profile strategy for minimizing torque ripple and current.
Figure 7:
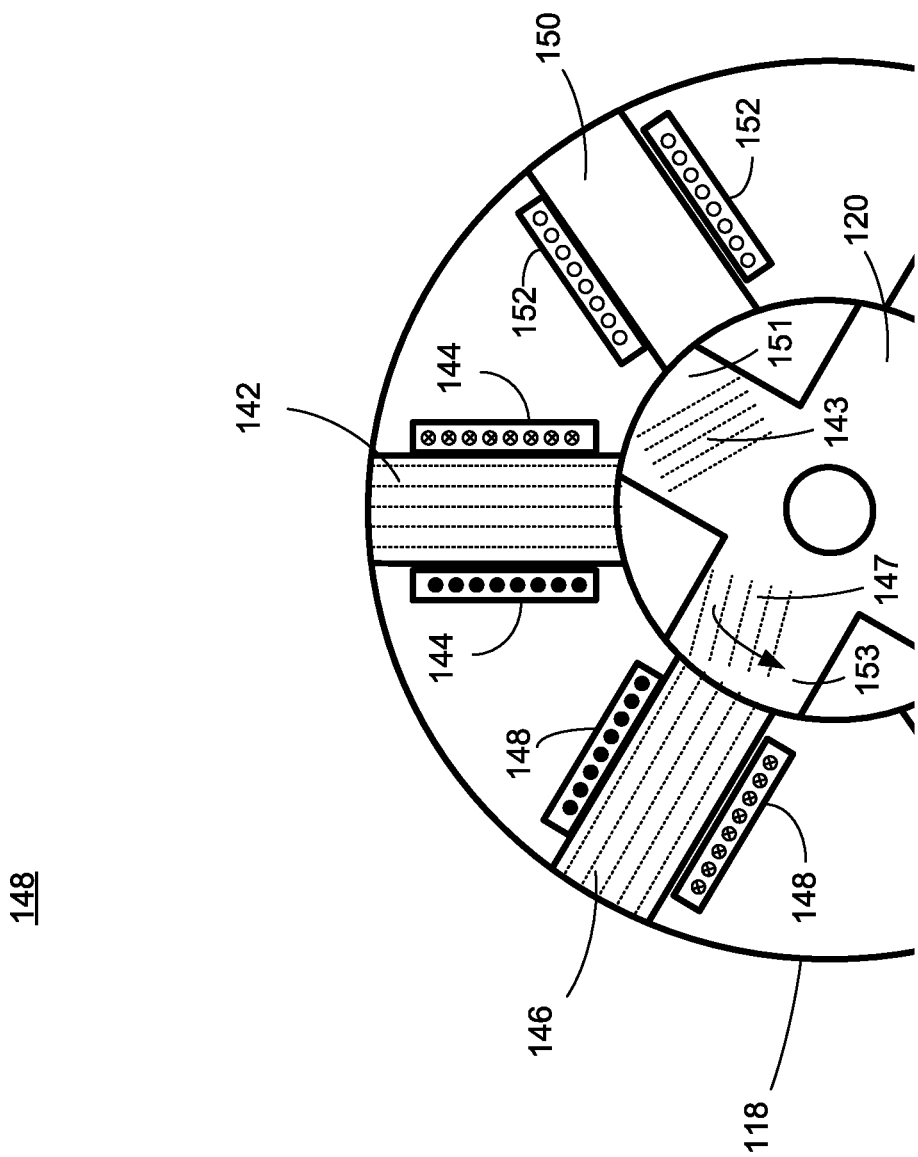
FIG. 7 is a partial section view of the exemplary electric motor of FIG. 2.

FIG. 6 is a flow chart of a method 200 of minimizing torque ripple and phase current. FIG. 7 illustrates a SR motor with two poles or phases energized at a moment-in-time. Stator pole 142 generates magnetic flux 143 that causes the rotor pole 151 to be drawn toward the stator pole 142. Similarly, current in the stator pole 146 also causes the rotor pole 153 to turn counterclockwise toward the stator pole 146. Because the rotor pole 153 is almost completely aligned with stator pole 146, its magnetic field contributes little torque to the rotor.

FIGS. 9A and 9B disclose an approach to providing a low torque ripple output while also avoiding phase overcurrent conditions. Some advantages of avoiding phase overcurrent conditions in accordance with various implementations of this disclosure may include, but are not limited to, a reduction in the amount of heat that is generated by the SR motor, and the ability to use components of lower current ratings than would be required to withstand phase overcurrent. The input phase currents 300, 304 and 308 of FIG. 9A are controlled following the method 200 of FIG. 6 to shape the phase torque outputs 302, 306, 310 to provide a substantially level total torque output 312. In an embodiment, the shape of an individual input phase current, e.g., input phase current 300, may correspond to a particular current profile that is appropriate for use with a particular mode of operation, such as high torque at low RPM. In other modes of operation, other input phase current profiles may be used, such as a constant current profile at higher RPMs, for example, when operating above about 250 RPM.

Turning to FIG. 6, an exemplary method 200 of implementing a current profile strategy for minimizing torque ripple and current is shown. A controller may determine a desired torque at the SR machine (step 202). This determination may be based, e.g., on a load at the electric motor 116. Relatively high torque conditions and corresponding high current conditions may occur at low speeds and therefore relatively low rpm (revolution per minute) for electric motor 116. In various exemplary implementations, the method 200 may only be invoked at speeds below about 200 rpm.

The controller 166 may determine the desired torque at the SR machine by receiving an input signal via control input 176 related to an operator request that requires power from the electric motor 116. The input signal may correspond to a change in a throttle lever or may be in response to a command related to a hydraulic implement such as raising a bucket in a loader. The controller 166 may determine a desired torque required to meet the demand associated with the operator request. For example, an operator request to increase the speed of the machine 100 from 0 to 5 mph may result in a desired torque equal to a maximum rated output of the electric motor 116.

A given electric motor, such as electric motor 116, may produce an amount of torque that is a function of rotor angle and phase current. The level of current required to produce a particular torque at a rotor angle can be calculated or taken from a lookup table. At step 204, the controller 166 may evaluate a state of the electric motor 116, e.g., position of the rotor 120, and calculate a requested current at a particular phase needed to supply the desired torque.

At step 206, the requested current may be compared to a maximum rated or other threshold current for the phase. If, at step 206 the requested current is less than the threshold current (step 206: No) the actual current for the phase may be set to the requested current (step 208). The control electronics 114 may operate the drive circuits discussed above to supply the actual current in the phase.

If, at step 206, the requested current is greater than the threshold current for the phase (step 206: Yes), the current in the phase may be adjusted to the threshold current (step 210). That is, rather than supplying the requested current, the current actually delivered to the phase may be set at the threshold current.

At step 212, the amount of torque lost due to reduction of current in a phase may be calculated. An actual torque produced by the phase at the threshold current for the current rotor position can be calculated as well as a torque loss or torque shortfall compared to the desired torque. In an exemplary embodiment, the desired torque may be the rated torque of the electric motor 116.

At step 214, a required current to be applied to an adjacent phase of the stator on the SR machine to make up the torque loss may be calculated. However, depending on rotor position, the required current for the adjacent phase may also be above its rated maximum or other predetermined threshold current.

At step 216, a determination is made as to whether the required current in the adjacent phase is greater than the threshold current. If the required current is below the threshold current for the phase (step 216: No) the current for the adjacent phase may be set to the requested current (step 218). In some embodiments, the threshold current may be greater than a rated maximum for the circuit depending on other conditions such as expected duration or temperature.

If the required current is greater than the threshold current for the phase (step 216: Yes) the required current may be adjusted down to the threshold current or other setting and the control electronics 114 may supply only the predetermined current to the adjacent phase. The method 200 may be executed on a continuous basis so that a primary phase current and an adjacent phase current may be calculated dozens or hundreds of times per revolution.

As can be seen in FIG. 9B, a situation may arise where overlapping phase currents, e.g., phase current 300 and 304, may produce corresponding phase torques that do not necessarily maintain a total torque output 312 that is perfectly flat. If the anticipated level of torque ripple is within a desired range so that the ripple meets the specifications for a particular application, then this level of ripple may be acceptable. However, reductions in ripple to a virtually flat line torque output are possible using one or all of i) more accurate characterizations of current and torque, ii) more accurate rotor position sensing, and iii) higher-speed loop times so that more phase current adjustments per revolution may be made. The use of more accurate phase current sensors and/or instantaneous torque measurements may also be used to reduce torque ripple.

Figure 8:
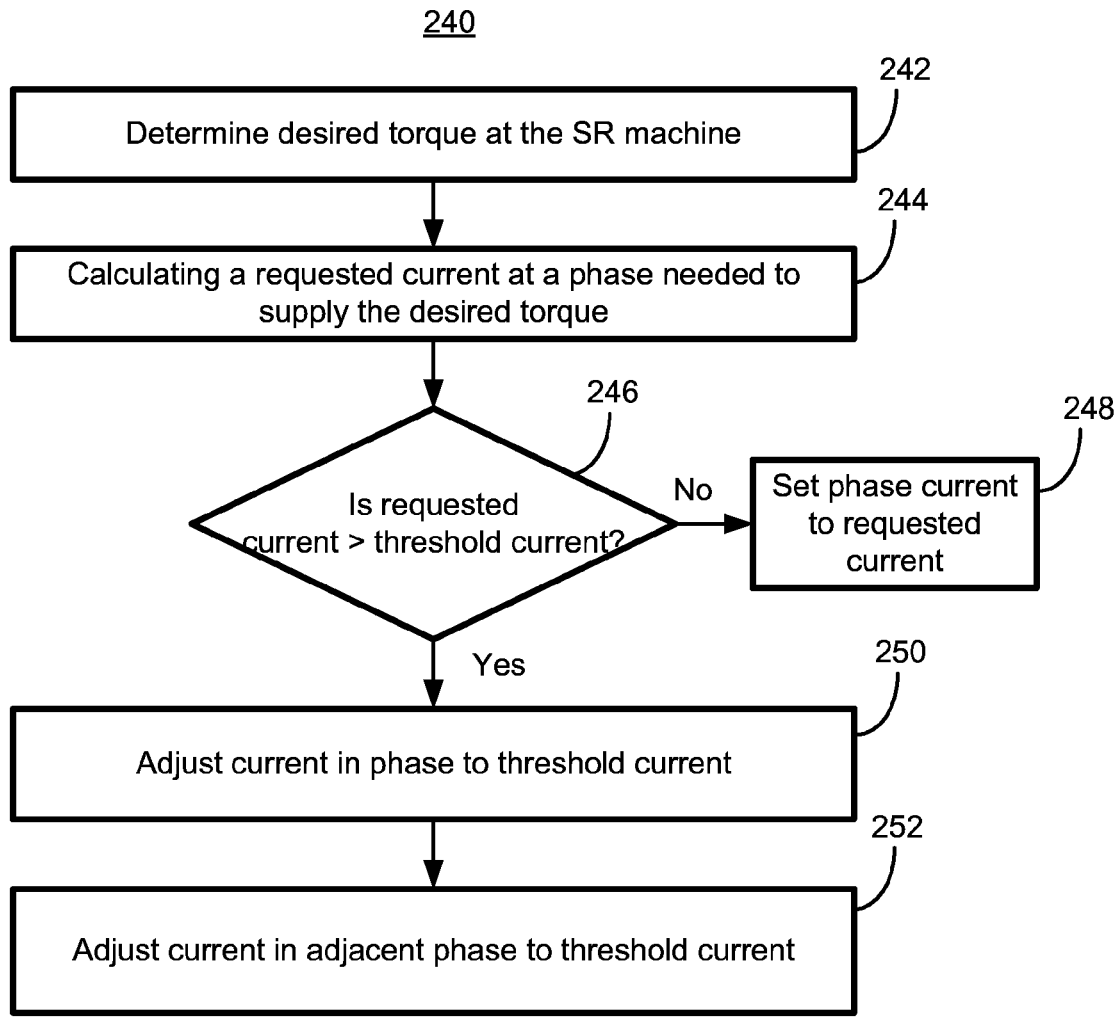
FIG. 8 is a flowchart of an alternate exemplary method of implementing the current profile strategy for minimizing torque ripple and current.

FIG. 8 shows a flowchart of an alternate exemplary method 240 of implementing a current profile strategy for minimizing torque ripple and current. At step 242, the controller 166 may determine a desired torque at the SR machine. The controller 166 may receive an input signal via control input 176 related to an operator request that requires power from the electric motor 116. The input signal may correspond to a change in a throttle lever or may be in response to a command related to a hydraulic implement such as raising a bucket in a loader. The controller 166 may determine a desired torque required to meet the demand associated with the operator request.

As discussed above, a given electric motor, such as electric motor 116, may produce an amount of torque that is a function of rotor angle and phase current. The level of current required to produce a particular torque at a rotor angle can be calculated or taken from a lookup table. At step 244, the controller 166 may evaluate a state of the electric motor 116, e.g., position of the rotor 120, and calculate a requested current at a first phase of the electric motor 116 needed to supply the desired torque.

At step 246, the requested current may be compared to a maximum rated or other threshold current for the first phase. If the requested current is less than the threshold current (step 246: No) the actual current for the first phase may be set to the requested current (step 248). As discussed above, the control electronics 114 may operate the drive circuits to supply the actual current in the first phase.

If, at step 246, the requested current is greater than the threshold current for the first phase (step 246: Yes), the actual current for the first phase may be set to the threshold current or other predetermined current (step 250). That is, rather than supplying the requested current, the current actually delivered to the first phase is set at the threshold current or other predetermined current setting.

At step 252, rather than calculating a reduction in torque from the first phase as discussed above for method 200, the current in a second, adjacent phase may be set to a threshold value for the second phase. This may reduce the processing demand on the controller 166 while still providing an acceptable increase in torque to at least partially compensate for the reduction in torque at the first phase. In some embodiments, the threshold current may be greater than a rated maximum for the circuit depending on other conditions such as expected duration or temperature.

FIGS. 10A and 10B disclose an alternate approach to providing a low torque ripple output while also avoiding phase overcurrent conditions. FIGS. 9A and 9B disclose clipping a phase current, e.g., phase current 300 at a threshold level. FIG. 10A illustrates phase currents 320, 322, and 324. When a particular phase current profile, e.g., phase current 320 would exceed a threshold level, the entire curve may be shifted down so that its peak is below the threshold level. Adjacent phase current profiles may be increased so that their peak values are also at the threshold level with further profiling below the threshold level to at least partially compensate for the reduction in torque of the first phase while providing a reduced ripple torque output 326 shown in FIG. 10B.

In general, the foregoing disclosure finds utility in various industrial applications, such as the farming, construction and mining industries in providing smoother and more efficient control of electric motors typically used in association with work vehicles and/or machines, such as tractors, backhoe loaders, compactors, feller bunchers, forest machines, industrial loaders, skid steer loaders, wheel loaders, and the like. More specifically, the disclosed control systems and methods may be applied to electric drive systems and machines having switched reluctance motors or other comparable motors commonly used in the art.

The systems and methods disclosed herein provide a strategy for supplying rated torque output from an electric motor with minimized ripple while protecting stator windings from unacceptably high current levels.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling an electric motor, the method comprising:
    determining a desired torque at the electric motor;
    calculating, at a controller, a calculated current at a first phase of the electric motor,
        the calculated current being a current that results in supplying the desired torque at the electric motor;
    comparing, at the controller, the calculated current to a predetermined threshold current;
    when the calculated current is greater than the predetermined threshold current, reducing, at the controller, the calculated current to the predetermined threshold current;
    calculating, at the controller, a loss in torque produced by the electric motor as a result of reducing the calculated current in the first phase to the predetermined threshold current;
    adjusting a current in a second phase adjacent to the first phase of the electric motor to continue to supply the desired torque at the electric motor,
        the adjusted current being calculated to substantially offset the loss in torque produced by the electric motor; and
    reducing the adjusted current in the second phase to the predetermined threshold current when the adjusted current in the second phase is greater than the predetermined threshold current.

2. The method of claim 1, wherein adjusting the current in the second phase adjacent to the first phase comprises increasing the current in the second phase to the predetermined threshold current.

3. The method of claim 1, wherein adjusting the current in the second phase to continue to supply the desired torque at the electric motor comprises reducing the current in the second phase to the predetermined threshold current when the current in the second phase will exceed the predetermined threshold current.

4. The method of claim 1, further comprising:
    determining that the electric motor is operating below about 250 revolutions per minute prior to reducing, at the controller, the calculated current at the first phase to the predetermined threshold current.

5. The method of claim 4, further comprising:
    when the electric motor is operating above about 250 revolutions per minute,
    operating the electric motor with a phase current profile that applies less than the predetermined threshold current to the first phase.

6. A system for controlling an electric motor, the system comprising:
    a switching bank configured to individually control current in each of a plurality of phases of a stator in the electric motor; and
    a controller configured to:
        determine a desired torque to be produced by the electric motor;
        calculate a current during a first phase of the electric motor required to supply the desired torque;
        determine whether the calculated current during the first phase is greater than a threshold current for the first phase;
        when the calculated current is greater than the threshold current, limit the calculated current during the first phase to the threshold current;
        calculate a shortfall of torque in the first phase resulting from limiting the calculated current in the first phase;
        adjust a current in a second phase of the stator adjacent to the first phase to at least partially compensate for the shortfall of torque in the first phase resulting from limiting the calculated current during the first phase; and
        limit the adjusted current in the second phase to the threshold current when the adjusted current is greater than the threshold current.

7. The system of claim 6, wherein the controller is further configured to operate both the first phase and the second phase concurrently at the threshold current for at least a portion of a revolution of a rotor of the electric motor.

8. The system of claim 6, wherein the controller is further configured to:

determine that a speed of the electric motor is below about 250 revolutions per minute prior to increasing a current in the second phase of the stator adjacent to the first phase to at least partially compensate for the shortfall of torque at the first phase.

9. The system of claim 6, wherein the controller is further configured to control current in at least one of the first phase or the second phase of the stator of the electric motor to a different current profile when a speed of the electric motor is greater than about 250 revolutions per minute than when the speed of the electric motor is less than about 250 revolutions per minute.

10. A method of managing torque and phase current in an electric motor using a controller, the method comprising:
   limiting, via the controller, current in a first phase of the electric motor at a predetermined threshold current based on a load on the electric motor that requires current in the first phase that is greater than the predetermined threshold current;
   calculating, at the controller, a current in the second phase to provide supplemental torque corresponding to a difference between the load and a torque provided by the electric motor when the first phase is energized with the predetermined threshold current;
   increasing, via the controller, the current in the second phase of the electric motor by an amount sufficient to allow the electric motor to meet the load; and
   limiting, via the controller, the current in the second phase at the predetermined threshold current when the current in the second phase exceeds the predetermined threshold current.

11. The method of claim 10, further comprising:
   determining, at the controller, a required current in the first phase to meet the load.

12. The method of claim 11, further comprising:
   calculating, at the controller, the torque provided by the electric motor when the first phase is energized with the predetermined threshold current.

13. The method of claim 10, wherein limiting, via the controller, current in the first phase of the electric motor at the predetermined threshold current comprises selecting a phase current profile that limits the current during at least a portion of a revolution of the electric motor to the predetermined threshold current.

14. The method of claim 13, further comprising selecting another phase current profile when a speed of the electric motor is greater than about 250 revolutions per minute.

15. The method of claim 10, further comprising determining that the electric motor is operating below about 250 revolutions per minute prior to limiting, via the controller, the current in the first phase of the electric motor at the predetermined threshold current.

16. The method of claim 10, further comprising:
   when the electric motor is operating above about a threshold revolutions per minute, operating the electric motor with a phase current profile that applies less than the predetermined threshold current to the first phase.

\* \* \* \* \*